PRIORITY PUBLIC ADDRESS SYSTEM

Filed March 15, 1954 4 Sheets-Sheet 1

INVENTOR.
EDWARD S. PETERSON
BY [signature]
ATTY.

Nov. 1, 1955 E. S. PETERSON 2,722,566

PRIORITY PUBLIC ADDRESS SYSTEM

Filed March 15, 1954 4 Sheets-Sheet 2

INVENTOR.
EDWARD S. PETERSON
BY Wm. Watts Owen
ATTY.

Nov. 1, 1955 E. S. PETERSON 2,722,566

PRIORITY PUBLIC ADDRESS SYSTEM

Filed March 15, 1954 4 Sheets-Sheet 3

INVENTOR.
EWARD S. PETERSON

BY Wm. Walter Owen

ATTY.

Nov. 1, 1955 E. S. PETERSON 2,722,566

PRIORITY PUBLIC ADDRESS SYSTEM

Filed March 15, 1954 4 Sheets-Sheet 4

INVENTOR.
EDWARD S. PETERSON

BY Wm. Watts Owen

ATTY.

2,722,566

PRIORITY PUBLIC ADDRESS SYSTEM

Edward S. Peterson, Elmwood Park, Ill., assignor to Automatic Electric Laboratories, Inc., Chicago, Ill., a corporation of Delaware Application March 15, 1954, Serial No. 416,060

13 Claims. (Cl. 179—1)

Figure 1:
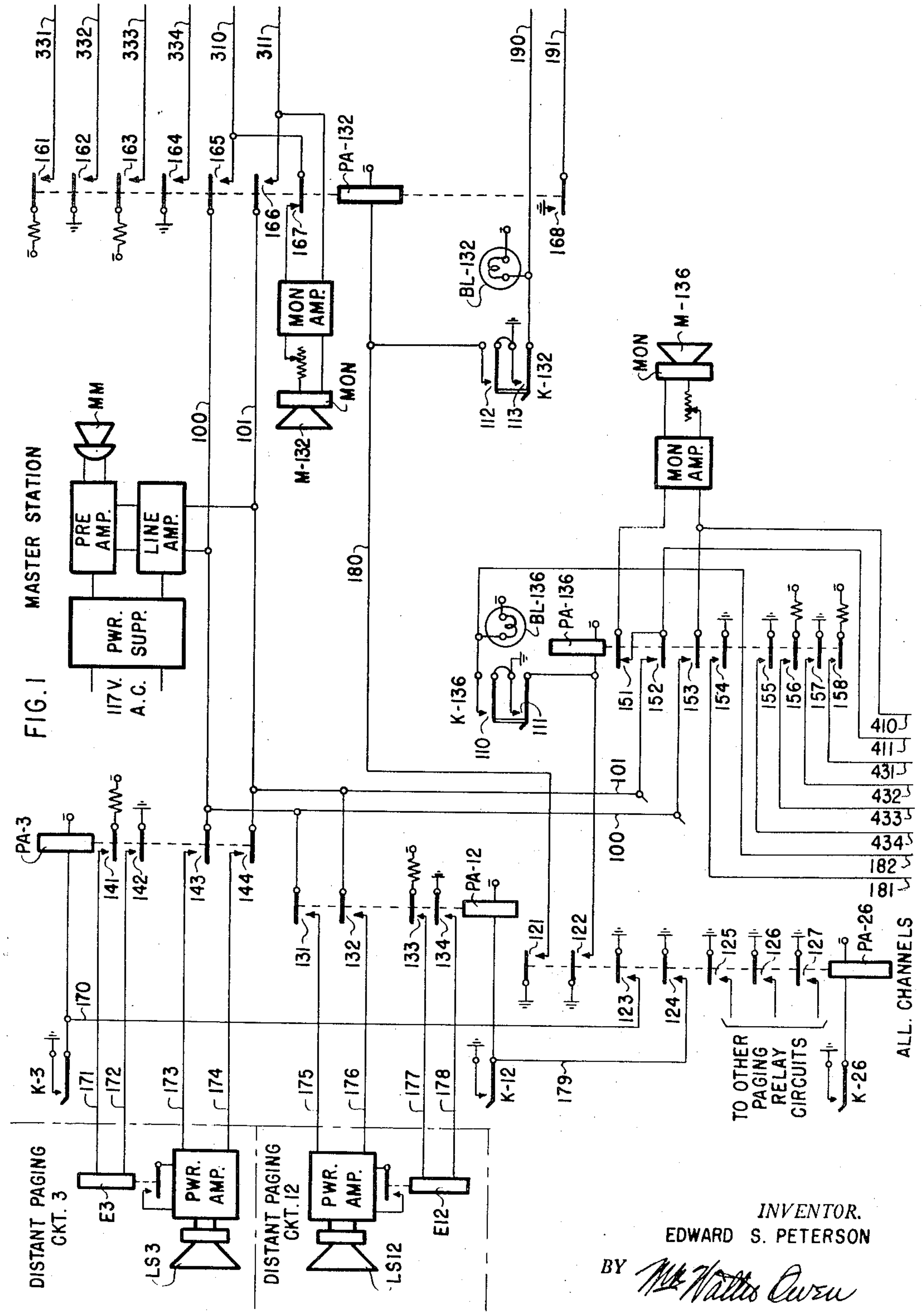

This invention relates in general to loud speaking communication systems and more particularly to a public address, or paging, system for establishing and monitoring messages transmitted over the public address equipment interconnecting several buildings and adjacent areas.

In the present invention a plurality of local transmitting stations, each located in a building in its own particular local area, has means for establishing loud speaking communication to receiving stations located in adjacent local area buildings. These local transmitting stations are connected to a subordinate transmitting station in another building, centrally located with respect to the buildings of the local transmitting stations, and this subordinate transmitting station has means for establishing loud speaking communication to the above-mentioned local receiving stations and to the local transmitting stations. A master, or emergency, transmitting station, located in a further building or in the same building with the subordinate transmitting station, has means for establishing loud speaking communication to all receiving stations including said mentioned local receiving stations and to said subordinate station. A receiving circuit is provided for each respective local transmitting station and the corresponding local receiving stations are connected thereto. These receiving circuits are also connected to both the subordinate and master transmitting stations. Each local transmitting station has a monitor circuit normally connected to its respective receiving circuit and the subordinate and master transmitting stations each have a monitor circuit normally connected to each such receiving circuit so that when any one transmitting station is transmitting messages thereover the remaining transmitting stations may monitor such messages. The monitor circuit at the station doing the transmitting is disconnected from the receiving circuit over which the messages are being transmitted. The local transmitting stations can establish loud speaking communication to only their own local areas; the subordinate transmitting station can establish loud speaking communication to said local transmitting stations and to the local receiving stations connected to such local transmitting stations, and the master transmitting station can establish loud speaking communication to said subordinate and local transmitting stations, to said local receiving stations, and to other receiving stations at other distant points.

The main object of the present invention is to provide an improved loud speaking communication, or public address, system of the above described type.

Another object of the invention is the provision of means for giving first choice priority to the master transmitting station, second choice priority to the subordinate transmitting station, and last choice to the local transmitting stations. In connection with this last object means is provided whereby the subordinate transmitting station may disconnect the transmitting circuit of any local transmitting station from its local receiving circuit during local transmission thereover and automatically reconnect the monitoring circuit at the disconnected local transmitting station to the local receiving circuit so as to monitor the messages transmitted by the subordinate station to the local receiving stations, thereby giving the subordinate station priority over the local transmitting station. In addition the master transmitting station has priority over both the subordinate and local transmitting stations by disconnecting the transmitting circuits of either the subordinate or local transmitting stations from the receiving circuit and for automatically reconnecting the monitoring circuit of either the subordinate or local transmitting stations to said receiving circuit to monitor the messages from the master station in case such monitoring circuit has been disconnected from the receiving circuit.

Other objects and features of the invention will be apparent from the following description, reference being made to the accompanying circuit drawings in which—

Figure 2:
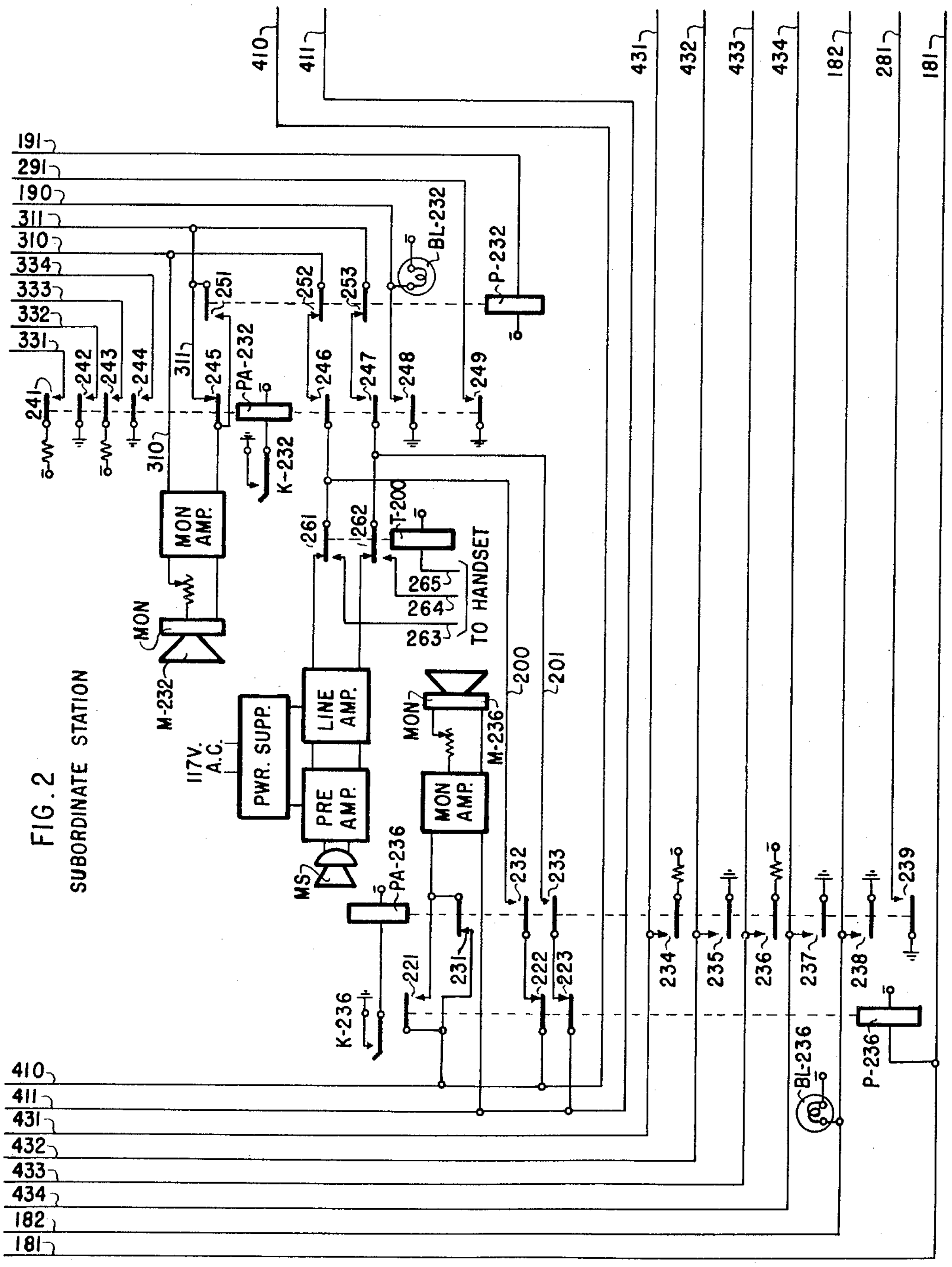
Figure 3:
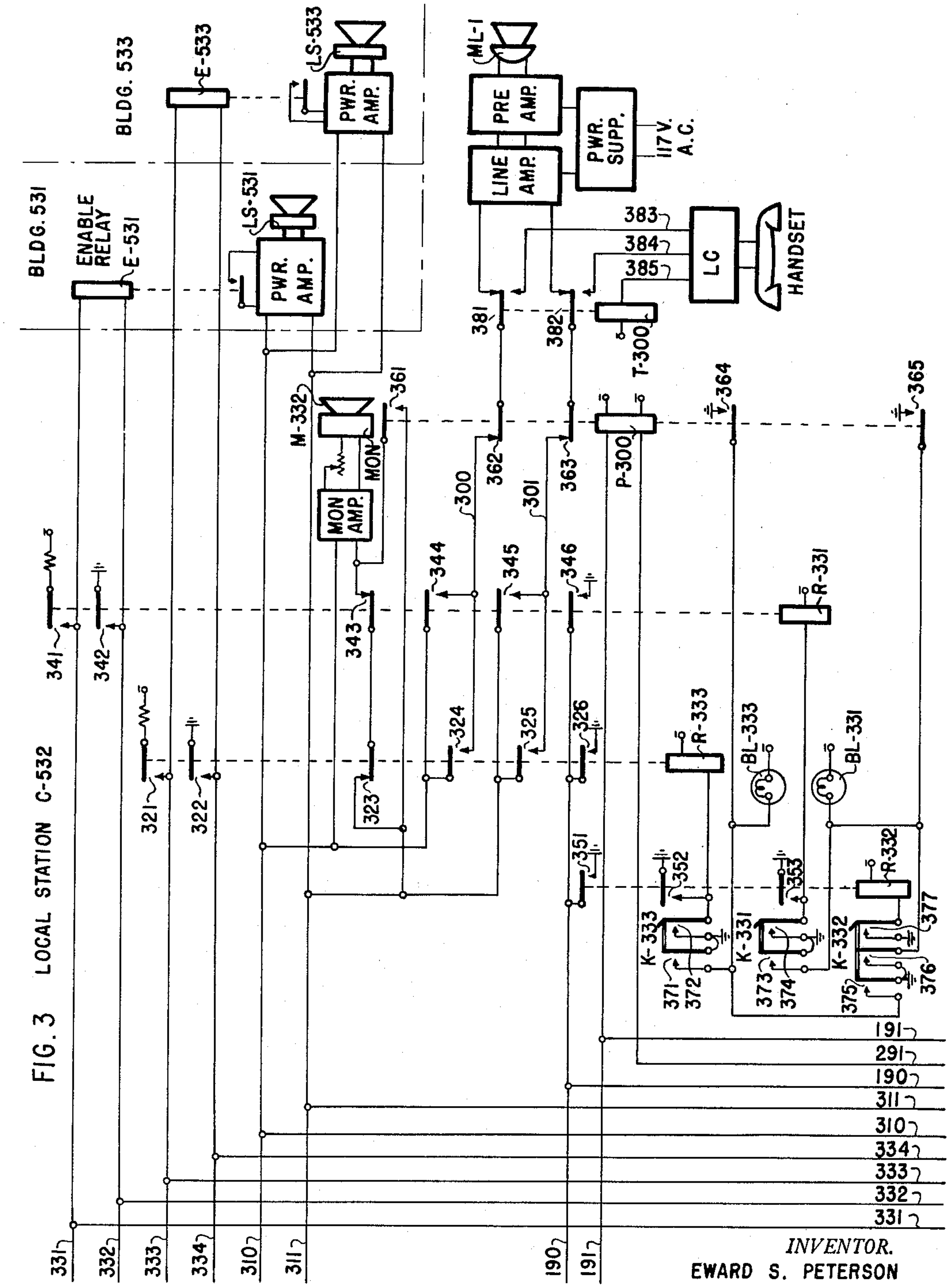
Figure 4:
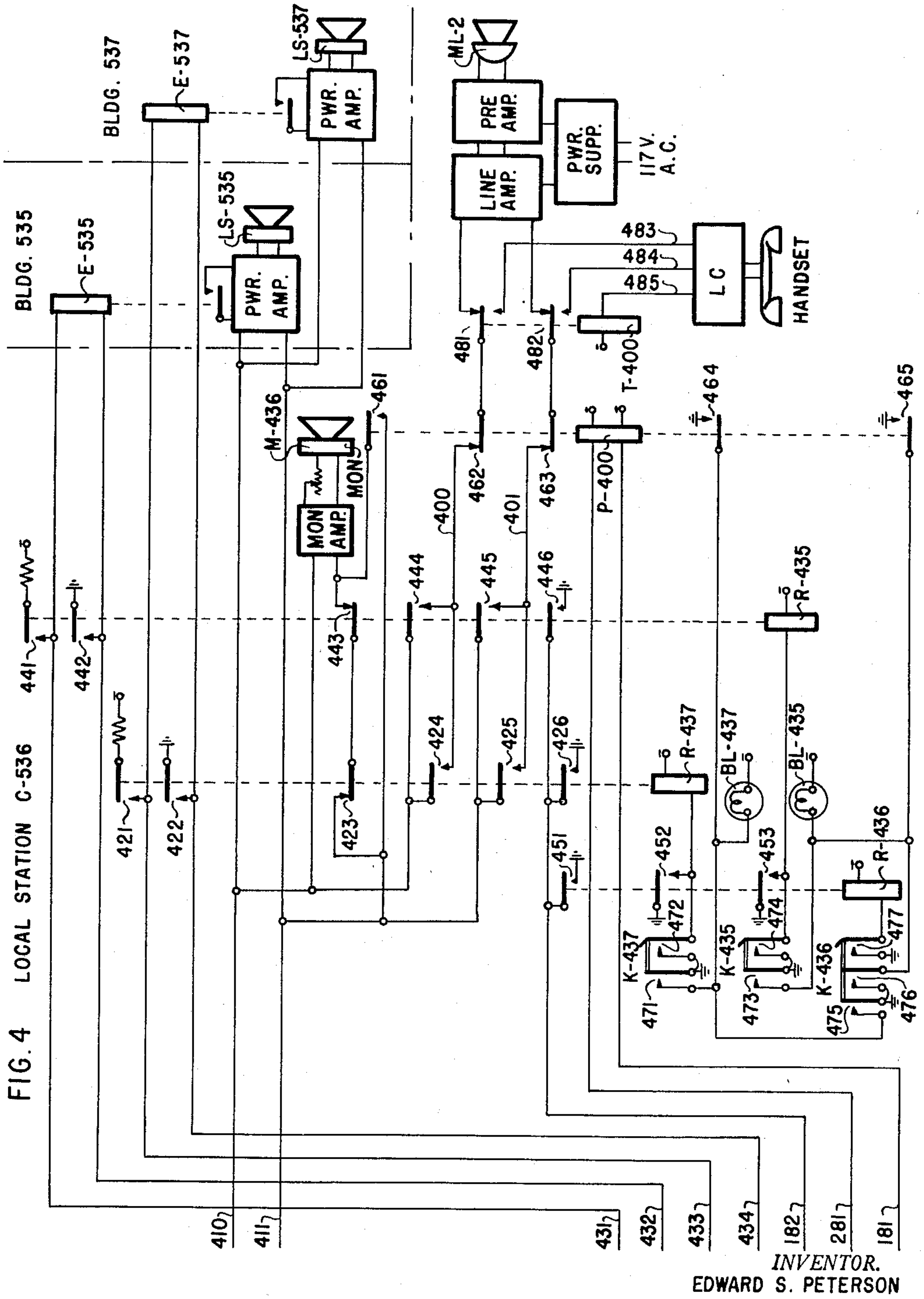

Fig. 1 diagrammatically illustrates the master transmitting station and two of the distant receiving stations, or paging circuits; Fig. 2 illustrates the subordinate transmitting station; Fig. 3 illustrates one of the local transmitting stations and two of its local receiving stations; and Fig. 4 illustrates another local transmitting station and its local receiving stations.

The transmitting circuit at each of the transmitting stations includes a microphone, a preempt amplifier (PRE AMP), a line amplifier (LINE AMP), a power supply (PWR. SUPP) with its source of alternating current. Each monitor circuit at the transmitting stations includes a monitor amplifier (MON. AMP), a variable resistor and a monitor loud speaker. Each local receiving station includes an enabling relay for activating, or enabling, the associated power amplifier PWR AMP and a loud speaker LS. These types of amplifiers and loud speakers are well known and in common use.

The master, or emergency, transmitting station, shown in Fig. 1 has access to a plurality of keys, K–3 to K–26, only three of which are illustrated. These keys control paging relays, such as relays PA–3, which complete circuits for operating the power amplifier enabling relays, such as E3, and for connecting the master station transmitting circuit over conductors, such as conductors 100—101, to the power amplifier and the distant paging circuits. The key K–26 controls relay PA–26 which in turn completes circuits for operating all of the paging relays in the entire system to thereby enable all receiving stations to hear the message transmitted from the master station. Key K–132 controls paging relay PA–132 and busy lamp BL–132 whenever the master station calls through the local transmitting station C–532 (Fig. 3) and over the receiving circuit comprising conductors 310 and 311 to the receiving stations in buildings 531 and 533. The busy lamp BL–132 is illuminated whenever the receiving circuit is in use. Key K–136 controls the paging relay PA–136 and busy lamp BL–136 whenever the master station calls through the local transmitting station C–536 (Fig. 4) to the receiving stations in buildings 535 and 537.

A monitor circuit is provided for each receiving circuit, that is, the monitor circuit M–132 is provided for monitoring the receiving circuit, comprising conductors 310 and 311, of the local transmitting station C–532 and the local receiving stations in buildings 531 and 533, and monitor circuit M136 is provided for monitoring the receiving circuit of local transmitting station C–536 comprising conductors 410 and 411.

The subordinate transmitting station (Fig. 2) illustrates two of the paging keys K–232 and K–236 for operating paging relays PA–232 and PA–236 when the subordinate wishes to call either of the local transmitting stations C–532 or C–536, and the receiving stations in buildings 531—533 or 535—537. Priority relays P232 and P236 are provided in the subordinate station for disabling, or disconnecting, the subordinate transmitting circuit and for enabling the monitoring circuit of the subordinate station whenever the master station calls either of the local transmitting stations C–532 or C–536 and their local receiving circuits.

The local transmitting station C–532 (Fig. 3) is provided with keys K331, K333 and K332 for selectively operating either, or both, relays R331 and R333 whenever the local transmitting stations calls its local receiving stations in buildings 531 and 533.

The local receiving circuit comprising conductors 310 and 311 extend from the local transmitting station to the power amplifiers in both these buildings and each building has an enabling relay, such as relay E531, for activating the power amplifier so that the messages transmitted over the receiving circuit will be audible from the associated loud speaker, such as LS531. A priority relay, such as relay P300, is provided in the local transmitting station for disconnecting the transmitting circuit of the local station from the receiving circuit and for reconnecting the monitor circuit to the receiving circuit. This priority relay is controlled from either the master station or the subordinate station to give the master station first choice, the subordinate station second choice, and the local transmitting station third choice on connections to the receiving circuit. Fig. 4 is similar to Fig. 3 in all respects.

Each of the subordinate and local transmitting stations have a connecting relay, such as relays T–200, T–300 and T–400, for connecting an operator's telephone handset in place of the usual loud speaking microphone circuit.

Having given a general description of the system, a detail description will now be given and for this purpose it will first be assumed that the local transmitting station C–532 (Fig. 3) desires to transmit a message over the local receiving circuit comprising conductors 310 and 311 to the local receiving stations in building 531. The operator operates key K–331 thereby closing contacts 374 to operate relay R–331 and closing contacts 373 to illuminate busy lamp BL–331. At contacts 341 and 342 relay R–331 closes an obvious circuit over conductors 331 and 332 for operating enabling relay E531 in building 531; at contacts 343 opens, or disables, his own monitor circuit to prevent feed-back; at contacts 344 and 345 connects his local transmitting circuit, comprising his line amplifier (LINE AMP), preempt amplifier (PRE AMP), and his microphone ML–1, to the local receiving circuit comprising conductors 310 and 311; and at contacts 346 grounds conductor 190 to illuminate lamp BL–132 in the master station and lamp BL–232 in the subordinate station to advise these stations that the local receiving circuit 310—311 is in use.

Enabling relay E531 closes its contacts to enable the power amplifier PWR AMP to operate loud speakers LS–531 in building 531 in accordance with any messages transmitted over the receiving circuit 310—311. It should be noted at this time that this receiving circuit is connected to the power amplifier in building 533 but since the enabling relay E533 is not operated, this amplifier is not enabled at this time, and the messages transmitted over the receiving circuit 310—311 do not operate the loud speakers LS533 in building 533. The local transmitting circuit is now connected to the local receiving circuit as follows: from the microphone ML–1 and its amplifiers back contacts 381 and 382, 362 and 363, make contacts 344 and 345 to the receiving circuit line conductors 310 and 311 and over the activated power amplifier and loud speakers LS–531. The monitor circuit at the master station (Fig. 1) is normally connected by way of contacts 167 to this receiving circuit and the monitor circuit at the subordinate station (Fig. 2) is also normally connected by way of contacts 245 to this receiving circuit. The messages transmitted by the local transmitting station are therefore audible to both the master and subordinate stations as well as the local receiving stations in building 531.

In a similar manner the local transmitting station may actuate key K–333 and relay R333 to in turn operate enabling relay E533 so that only the loud speakers LS–533 in building are operated over the receiving circuit 310—311 while being monitored at the master and subordinate stations. In case the local transmitting station desires to transmit messages simultaneously to loud speakers LS–531 and LS–533 in both buildings 531 and 533, the key K–332 operates to operate relay R332 which in turn at contacts 352 and 353 operates both relays R331 and R333. In case the operator desires to use a telephone handset instead of the microphone ML–1 the telephone relay T–300 is operated in any well known manner to disconnect the microphone and its amplifiers and to substitute the line circuit LC and handset at contacts 381 and 382.

The local transmitting station C–536 in Fig. 4 is similar to that shown and described for Fig. 3 except that this local transmitting station transmits messages over the local receiving circuit 410—411 to the loud speakers in buildings 535 and 537 in a manner similar to that described for Fig. 3. Both the master station monitor circuit M136 and the subordinate station monitor circuit M236 being normally connected to the local receiving circuit 410—411 enables such stations to monitor the messages transmitted thereover. The busy lamp BL–136 at the master station and the busy lamp BL–236 at the subordinate station being operated over conductor 182 when any of the relays R435, R436, or R437 are actuated by their individual keys K–435, K–436 or K–437.

It will now be assumed that the subordinate transmitting station (Fig. 2) desires to transmit messages to the local receiving stations in buildings 531 and 532 and to the local transmitting station C532 (Fig. 3) and therefore operates key K–232 to cause relay PA232 to operate over an obvious circuit. At contacts 241 and 242 relay PA–232 connects battery and ground to conductors 331 and 332 to operate enabling relay E531 in building 531. At contacts 243 and 244 relay PA–232 connects battery and ground to conductors 333 and 334 to operate enabling relay E533 in building 533; at contacts 245 opens the monitor circuit M–232 to prevent feed-back; and at contacts 246 and 247 connects the subordinate transmitting circuit to the receiving circuit 310—311 to enable the subordinate operator to transmit messages over the receiving circuit to the local transmitting station C–532 and to the local receiving stations LS–531 and LS–533. At contacts 248 relay PA–232 grounds conductor 190 to light busy lamp BL–232 in the subordinate station and busy lamp BL–132 in the master station. At contacts 249 relay PA–232 grounds priority conductor 291 which extends to the lower winding of priority relay P–300 (Fig. 3) for energizing this relay to give priority to the subordinate station.

The operation of the enabling relays E531 and E533 enable their respective power amplifiers to operate their associated loud speakers LS–531 and LS–533 to audibly respond to the messages sent from the subordinate station. Priority relay P–300 at contacts 361 reconnects the monitor circuit M–332 to the receiving circuit 310—311 in case the monitor circuit had been disconnected at contacts 323 or 343 by the operation of relays R–333 or R–331. At contacts 362 and 363 priority relay P–300 disconnects the local transmitting circuit from the receiving circuit in case the local station was transmitting at the time the subordinate station intervened. At contacts 364 relay P–300 lights the busy lamp BL–333 and at contacts 365 lights the busy lamp BL–331 to advise the local transmitting station that the local receiving circuit is in use by either the subordinate or master stations. The subordinate operator by means of his transmitter MS transmits messages over his transmitting circuit and over the receiving circuit 310—311 to the local receiving stations LS–531 and LS–533, to the local transmitting station over monitor circuit M–332 and to the master station over contacts 167 and monitor circuit M–132.

After transmission of the desired messages the subordinate operator restores key K–232 to restore relay PA–232 thereby restoring enabling relays E531 and E533 in case relays R–333 and R–331 are restored. At contacts 245 relay PA–232, on restoring, reconnects the monitor circuit M–232 to the local receiving circuit 310—311, at contacts 246 and 247 disconnects the subordinate transmitting circuit from the receiving circuit, at contacts 248 disconnects ground from conductor 190 to darken lamps BL–232 and BL–231 in case relays R331, R332 and R333 are restored, and at contacts 249 opens the circuit to priority relay P–300 which now restores. Relay P–300 extinguishes lamps BL–331 and BL–333 in case keys K–331, K–332 and K–333 are in normal position, at contacts 361 opens the shunt circuit from around contacts 323 and 343, and at contacts 362 and 363 prepares the local transmitting circuit for connection to the receiving circuit. In case the subordinate station had interrupted the local transmitting station and the operator at the local transmitting station had not restored the operated selecting key, such as key K–333, then the relay R–333 is still operated and the busy lamps BL–333, BL–132 and BL–232 are still illuminated, the monitor circuit M–332 is disconnected at contacts 323 and the transmitting circuit is reconnected to the local receiving circuit when priority relay P–300 closes contacts 362 and 363.

In case the subordinate operator desires to transmit messages to the local receiving stations in buildings 535 and 537 and to the local transmitting station C–536 (Fig. 4), the key K–236 is operated to cause the operation of relay PA–236. Relay PA–236 is similar to relay PA–232 and closes similar circuits for controlling similar apparatus in local transmitting station C–536 and buildings 535 and 537. For example, relay PA–236 at contacts 231 disconnects the local receiving circuit 410—411 from the monitor circuit M–236, at contacts 232 and 233 connects the subordinate transmitting circuit MS to the receiving circuit 410 and 411, at contacts 234 to 237 connects battery and ground to conductors 431 to 434 to operate enabling relays E535 and E537 to enable their associated power amplifiers, at contacts 238 grounds conductor 182 to light busy lamps BL–236 and BL–136, and at contacts 239 grounds conductor 281 to operate priority relay P–400. Relay P–400 at contacts 461 closes a shunt around contacts 423 and 443 to enable monitor circuit M–436 in case either of the last-mentioned contacts are open, at contacts 462 and 463 disconnects the local transmitting circuit from the local receiving circuit if connected thereto by relays R437 or R435, and at contacts 464 and 465 lights the busy lamps BL–437 and BL–435. By operation of this priority relay P–400 the subordinate station has taken the transmission control away from the local transmitting station and the messages transmitted by the subordinate station are now audible at the local transmitting station over monitor circuit M–436 as well as being audible to the local receiving stations LS–535 and LS–537.

It will now be assumed that the master station desires to take over control of transmitting messages over the receiving circuit 310—311 regardless of whether the local transmitting station C–532 or the subordinate station is transmitting messages thereover. The master operator accordingly operates key K–132 to operate relay PA–132 over an obvious circuit and grounds conductor 190 at key contacts 113 to light busy lamps BL–132 and BL–232. At contacts 161 to 164 relay PA–132 connects battery and ground to conductors 331 to 334 to operate enabling relays E531 and E533 to enable their associated power amplifiers to operate their respective loud speakers LS–531 and LS–533. At contacts 165 and 166 relay PA–132 connects the master transmitting circuit MM with its amplifiers to the local receiving circuit 310—311 to enable the master operator to transmit messages over this receiving circuit. At contacts 167 relay PA–132 opens the master monitor circuit M–132 to prevent feedback, and at contacts 168 grounds conductor 191 to operate priority relay P–232 at the subordinate station and priority relay P–300 at the local transmitting station C–532.

The operation of priority relay P–232 at the subordinate station closes contacts 251 to reconnect the subordinate monitor circuit to the selected local receiving circuit 310—311 in case it had been disconnected therefrom at contacts 245, and at contacts 252 and 253 disconnects the subordinate transmitting circuit from the local receiving circuit in case it was connected thereto at contacts 246 and 247. The operation of priority relay P–300 at the local transmitting circuit accomplishes the same functions as described when it was operated from the subordinate station. The messages transmitted through the microphone MM at the master station are now audible at the subordinate station over monitor M–232, at the local transmitting station over monitor M–332 and at local receiving stations LS–531 and LS–533. The restoration of key K–132 restores relay PA–132 to restore the enabling relays E531 and E533 and to extinguish the busy lamps BL–132, BL–232, BL–331 and BL–333 in case neither the subordinate station or the local transmitting station keys K–232, K–333, K–331 or K–332 are operated with the result that all relays and apparatus are restored to normal as illustrated in the drawings.

In case the master operator desires to call the local transmitting station C–536 (Fig. 4) and the local receiving stations LS–535 and LS–537 in buildings 535 and 537 over the local receiving circuit 410—411 the key K–136 is actuated to operate relay PA–136 over an obvious circuit. Key contacts 110 grounds conductor 182 to light busy lamps BL–136 and BL–236. Relay PA–136 at contacts 151 disconnects the monitor circuit M–136 from the local receiving circuit 410—411 to prevent feed-back, at contacts 152 and 153 connects the master transmitting circuit MM with its amplifiers to the receiving circuit 410—411, at contacts 154 grounds conductor 181 to operate the subordinate priority relay P–236 and the local transmitting station priority relay P–400 over its lower winding, and at contacts 155 and 157 connects ground to conductors 434 and 432 and battery to conductors 433 and 431 to operate enabling relays E535 and E537 which enable their associated power amplifiers to cause their associated loud speakers LS–535 and LS–537 to respond to the messages transmitted by the master operator over the local receiving circuit 410—411. The operation of the subordinate priority relay P–236 at contacts 221 reconnects the subordinate monitor circuit M–236 to the local receiving circuit 410—411 in case such monitoring circuit is disabled at contacts 231, and at contacts 222 and 223 disconnects, or disables, the subordinate transmitting circuit. Priority relay P–400, in the same manner as previously described, enables the monitor circuit M–436 at contacts 461, disables the local transmitting circuit at contacts 462 and 463, and at contacts 464 and 465 lights the busy lamps BL–437 and BL–435.

It is obvious from the foregoing description that in case the master operator desires to transmit messages simultaneously over both local receiving circuits 310—311 and 410—411 then both keys K–132 and K–136 would be operated.

The master station may also transmit messages to distant paging circuits, such as paging circuits 3 and 12 illustrated in Fig. 1. In order to transmit messages to the paging circuit 3 key K–3 is operated to operate relay PA–3 over an obvious circuit. Relay PA–3 at contacts 142 and 141 connects ground and battery to conductors 172 and 171 to operate enabling relay E3 at the distant paging circuit. Relay E3 closes its contacts to activate the power amplifier and enable loud speaker LS-3 to respond to the transmitted messages. At contacts 143 and 144 relay PA-3 connects the master transmitting circuit to the paging circuit conductors 173 and 174 to operate loud speaker LS-3 in accordance with the transmitted messages. In a similar manner the master station may select and operate other keys, such as key K-12, to transmit messages to other distant paging circuits.

In case the master station desires to simultaneously transmit messages to all the local receiving stations, all the local transmitting stations, the subordinate station, and all the paging circuits the key K-26 operates to operate the all-channel relay PA-26. Relay PA-26 at contacts 121 grounds conductor 180 to operate relay PA-132, at contacts 122 operates relay PA-136, at contacts 123 operates relay PA-3, at contacts 124 operates relay PA-12 and at other contacts 125—127 operates the remaining paging relays (not shown). The operation of relays PA-132 and PA-136 and the paging relays, such as PA-3 and PA-12, perform the same function as previously described, thereby enabling the master station to simultaneously transmit messages over all channels in the entire system.

What is claimed is:

1. In a public address loud-speaking system, a first, a second, and a third transmitting station, a receiving station, a receiving circuit connected to said receiving station, a monitoring circuit at each transmitting station normally connected to said receiving circuit, a transmitting circuit at each transmitting station normally disconnected from said receiving circuit, selecting means at each transmitting station corresponding to said receiving station, enabling means at said receiving station for operatively enabling said receiving station to receive messages transmitted over said receiving circuit, a first means at said first transmitting station operated in response to the operation of the selecting means at said first station for disconnecting said first station monitoring circuit from said receiving circuit to prevent feed-back, for connecting said first station transmitting circuit to transmit messages thereover, and for operating said enabling means to enable said receiving station to receive said transmitted messages, a second means at said second transmitting station operated in response to the operation of the selecting means at said second station for disconnecting said second station monitoring circuit from said receiving circuit to prevent feed-back, for connecting said second station transmitting circuit to said receiving circuit to transmit messages thereover, and for operating said enabling means to enable said receiving station to receive said transmitted messages, disabling means in said first transmitting station operated responsive to the operation of said second means for reconnecting said first station monitoring circuit to said receiver circuit to enable monitoring of the messages transmitted by said second station and for disconnecting said first station transmitting circuit from said receiving circuit in case said first means is operated, a third means at said third transmitting station operated in response to the operation of the selecting means at said third station for disconnecting said third station monitoring circuit from said receiving circuit to prevent feed-back, for connecting said third station transmitting circuit to said receiving circuit to transmit messages thereover, for operating said enabling means at said receiving station to enable said receiving station to receive said transmitted messages, and for operating said disabling means at said first transmitting station, and further disabling means at said second station operated in response to the operation of said third means for reconnecting said second station monitoring circuit to enable monitoring of the messages transmitted by said third station, and for disconnecting said second station transmitting circuit from said receiving circuit in case said second means is operated.

2. In a public address system as claimed in claim 1 including a normally inactive power amplifier connected to said receiving circuit and a loud speaker connected to said amplifier at said receiving station and wherein said enabling means comprises a relay and contacts operated by said relay for enabling said power amplifier to respond to messages transmitted over said receiving circuit to operate said loud speaker.

3. In a public address system as claimed in claim 1 wherein said disabling means in said first transmitting station comprises a relay and contacts operated by said relay to reconnect said first station monitor circuit to said receiving circuit and other contacts operated by said relay to disconnect said first station transmitting circuit from said receiving circuit and wherein said further disabling means in said second station comprises another relay and contacts operated by said other relay to reconnect said second station monitor circuit to said receiving circuit and other contacts operated by said other relay to disconnect said second station transmitting circuit from said receiving circuit.

4. In a public address loud-speaking system as claimed in claim 1 including distant paging circuits and further selecting means individual to each paging circuit for operatively connecting the transmitting circuit at said third transmitting station to the selected paging circuit, an all-channel selecting means at said third transmitting station, and means responsive to the operation of said all-channel selecting means for operating said third means at said third station, said disabling means at said first station, said further disabling means at said second station, and all said further selecting means of all said distant paging circuits to connect said third station transmitting circuit to all channels including said receiving circuit and all said paging circuits.

5. In a public address loud-speaking system, a first, a second, and a third transmitting station, a receiving station, a receiving circuit connected to said receiving station, a monitor circuit at each transmitting station normally connected to said receiving circuit, a transmitting circuit at each transmitting station normally disconnected from said receiving circuit, selecting means at each transmitting station corresponding to said receiving circuit, a first means at said first transmitting station operated in response to the operation of the selecting means at said first station for disconnecting said first station monitor circuit from said receiving circuit to prevent feed-back and for connecting said first station transmitting circuit to said receiving circuit to transmit messages thereover, a second means at said second transmitting station operated in response to the operation of the selecting means at said second station for disconnecting said second station monitor circuit from said receiving circuit to prevent feed-back and for connecting said second station transmitting circuit to said receiving circuit to transmit messages thereover, priority means in said first transmitting station operated responsive to the operation of said second means for reconnecting said first station monitor circuit to said receiving circuit to enable monitoring of the messages transmitted from said second station and for disconnecting said first station transmitting circuit from said receiving circuit in case said first means is operated, a third means at said third transmitting station operated in response to the operation of the selecting means at said third station for disconnecting said third station monitor circuit from said receiving circuit to prevent feed-back, for connecting said third station transmitting circuit to said receiving circuit to transmit messages thereover, and for operating said priority means at said first transmitting station, and further priority means at said second station operated in response to the operation of said third means for reconnecting said second station monitor circuit to said receiving circuit to enable monitoring of the messages transmitted by said third station, and for disconnecting said second station transmitting circuit from said receiving circuit in case said second means is operated.

6. In a public address system as claimed in claim 5 including busy signalling means individual to said receiving circuit at each of said transmitting stations, and means for operating all said busy signalling means at all said transmitting stations at a time when any one of said transmitting circuits is connected to said receiving circuit.

7. In a public address system as claimed in claim 5 including busy signalling means individual to said receiving circuit at each of said transmitting stations, means for operating the busy signalling means at said first station in response to the operation of the selecting means at said first station or in response to the operation of said priority means in said first station, means for operating the busy signalling means at said second and third stations in response to the operation of said selecting means at said second or third stations or in response to the operation of said first means at said first station.

8. In a public address loud-speaking system, a master station, a subordinate station, a first local station, a second local station, a first receiving station, a first receiving circuit connecting said first receiving station to said first local station and to said subordinate and said master stations, a second receiving station, a second receiving circuit connecting said second receiving station to said second local station and to said subordinate and master stations; a transmitting circuit in each said master, subordinate, and local stations; a first local station connecting means for connecting said first local station transmitting circuit to said first receiving circuit, a second local station connecting means for connecting said second local station transmitting circuit to said second receiving circuit, means in each said local station for selectively operating its said local station connecting means to operatively connect its transmitting circuit to its connected receiving circuit to transmit messages thereover, a first selecting means at said subordinate station corresponding to said first receiving circuit and said first local and receiving stations, a second selecting means at said subordinate station corresponding to said second receiving circuit and said second local and receiving stations, a first subordinate connecting means operated responsive to the operation of said first subordinate selecting means for connecting said subordinate transmitting circuit to said first receiving circuit, a first priority means in said first local station operated in response to the operation of said first subordinate connecting means for disconnecting said first local station transmitting circuit from said first receiving circuit, a second subordinate connecting means operated responsive to the operation of said second subordinate selecting means for connecting said subordinate transmitting circuit to said second receiving circuit, a second priority means in said second local station operated in response to the operation of said second subordinate connecting means for disconnecting said second local station transmitting circuit from said second receiving circuit, a first master selecting means at said master station corresponding to said first receiving circuit and said first local and receiving stations, a second master selecting means at said master station corresponding to said second receiving circuit and said second local and receiving stations, a first master connecting means operated responsive to the operation of said first master selecting means for connecting said master transmitting circuit to said first receiving circuit and for operating said first priority means to disconnect said first local station transmitting circuit from said first receiving circuit, a first master priority means in said subordinate station operated in response to the operation of said first master connecting means for disconnecting said subordinate transmitting circuit from said first receiving circuit, a second master connecting means operated in response to the operation of said second master selecting means for connecting said master transmitting circuit to said second receiving circuit and for operating said second priority means to disconnect said second local station transmitting circuit from said second receiving circuit, a second master priority means in said subordinate station operated in response to the operation of said second master connecting means for disconnecting said subordinate transmitting circuit from said second receiving circuit, an all-channel selecting means in said master station selectively operable by the master station, and means responsive to the operation of said all-channel selecting means for simultaneously operating said first and second master station connecting means to thereby connect said master transmitting circuit to both said first and second receiving circuits and to operate said first and second subordinate priority means and said first and second local station priority means whereby said subordinate transmitting circuit is disconnected from both said receiving circuits, said first local transmitting circuit is disconnected from said first receiving circuit, and said second local transmitting circuit is disconnected from said second receiving circuit.

9. In a public address loud speaking system as claimed in claim 8 including a loud-speaking monitor circuit individual to each said receiving circuit and normally connected thereto in said master, subordinate, and local stations, monitor disconnecting means controlled by each said station connecting means when operated for disconnecting said monitor circuit from its individual receiving circuit, and monitor reconnecting means in said subordinate and local stations controlled by each said priority means when operated for reconnecting said monitor circuits at said subordinate and local stations to its individual receiving circuit.

10. In a public address loud-speaking system as claimed in claim 8 including a busy lamp and individual to each said receiving circuit at said master, subordinate, and local stations, and means for operating the busy lamps individual to any one receiving circuit at said master, subordinate and local stations when said one receiving circuit is connected to any one of said transmitting circuits at said master, subordinate, or local stations.

11. In a public address loud-speaking system as claimed in claim 10 wherein said busy lamp operating means for said local stations include said local station selecting means or said local station priority means, wherein said busy lamp operating means for said subordinate station includes said master, said subordinate or said local station connecting means, and wherein said busy lamp operating means for said master station includes said master station selecting means, said subordinate, or said local connecting means.

12. In a public address loud-speaking system as claimed in claim 8 wherein each receiving station includes a normally inactive amplifier and loud speaker connected to its individual receiving circuit, enabling means at each receiving station operative to enable said amplifier to cause said loud speaker to respond to messages transmitted over its said receiving circuit, and means controlled by said connecting means in said master, said subordinate, or said local stations for operating said enabling means.

13. In a loud speaking system, a master transmission station, a subordinate transmission station, a local transmission station, a plurality of receiving stations, receiving means at each of said stations, a receiving circuit connected to the receiving means of all of said stations, a transmission circuit at each of said transmission stations, means at each said transmission station for connecting the transmission circuit thereof to said receiving circuit and for transmitting messages thereover to the receiving means at all other stations, priority means in said local transmission station, means at the said subordinate and master stations for causing the operation of said priority means to disable the connecting means at said local transmission station, further priority means in said subordinate station, and means in the master station for causing the operation of said further priority means to disable the connecting means at said subordinate station.

No references cited.